United States Patent [19]
Batistoni et al.

[11] Patent Number: 5,388,131
[45] Date of Patent: Feb. 7, 1995

[54] METHOD AND DEVICE FOR MACHINING THE INTERNAL SURFACE OF A TUBULAR COMPONENT AND IN PARTICULAR AN ADAPTOR FIXED TO THE VESSEL HEAD OF A PRESSURIZED WATER NUCLEAR REACTOR

[75] Inventors: Michel Batistoni, Le Bourg; Pierre Pontvianne, Bethune, both of France

[73] Assignee: Framatome, Courbevoie, France

[21] Appl. No.: 102,785

[22] Filed: Aug. 6, 1993

[30] Foreign Application Priority Data

Aug. 6, 1992 [FR] France ............................. 92 09789

[51] Int. Cl.$^6$ ........................ G21C 21/00; B24C 3/00
[52] U.S. Cl. ................................... 376/316; 451/76
[58] Field of Search ............... 376/260, 316; 51/411, 51/429; 134/8, 22.12, 167 C, 168 C, 169 C

[56] References Cited

U.S. PATENT DOCUMENTS

| | | | |
|---|---|---|---|
| 4,633,623 | 1/1987 | Spitz | 51/439 |
| 4,800,063 | 1/1989 | Mierswa et al. | 376/316 |
| 5,001,870 | 3/1991 | Yokota et al. | 376/260 |

FOREIGN PATENT DOCUMENTS

| | | |
|---|---|---|
| 2094679 | 9/1982 | United Kingdom . |
| 2236065 | 3/1991 | United Kingdom . |
| 92/03269 | 3/1992 | WIPO . |

OTHER PUBLICATIONS

Kernenergie, vol. 15, No. 8, Aug. 1972, pp. 264, 267, 268.
Feinwerktechnik & Messtechnik, vol. 99, No. 6, Jun. 1991, pp. 81–86.
8th International Symposium on Jet Cutting Technology, 9 Sep. 1986, Durham, England, N. Hashish, pp. 297–308.

*Primary Examiner*—Daniel D. Wasil
*Attorney, Agent, or Firm*—Pollock, Vande Sande & Priddy

[57] ABSTRACT

A high-speed abrasive liquid jet is directed at the surface of the component (13) with an angle of incidence between 30° and 90°. The jet is moved so as to sweep over the internal surface of the component (13). At least two successive machining passes are made. The speed of sweeping increases from one machining pass to the next. The device (30), mounted so as to move in translation and in rotation inside the adaptor (13), consists of a tube assembly supplied with pressurized liquid onto which a nozzle (33) is fixed.

14 Claims, 3 Drawing Sheets

METHOD AND DEVICE FOR MACHINING THE INTERNAL SURFACE OF A TUBULAR COMPONENT AND IN PARTICULAR AN ADAPTOR FIXED TO THE VESSEL HEAD OF A PRESSURIZED WATER NUCLEAR REACTOR

FIELD OF THE INVENTION

The invention relates to a method for machining, with removal of material to a monitored depth, the cylindrical internal surface of a tubular component, and in particular the internal surface of an adaptor passing through the vessel head of a nuclear reactor.

BACKGROUND OF THE INVENTION

Pressurized water nuclear reactors generally include a vessel containing the core of the reactor which is immersed in pressurized water for cooling the reactor. The vessel of the reactor, which has a generally cylindrical shape, includes a head which has a hemispherical shape and which can be fitted onto its top.

The head is drilled with holes, at each of which there is fixed by welding a through tubular component constituting an adaptor allowing passage and control of the movement of an extension of a rod cluster for controlling the reactivity of the core or a through passage for a means for measuring inside the reactor, such as a thermocouple column.

The mechanisms for controlling the movement of the core reactivity control rod clusters are fixed to the end parts of each of the adaptors.

Inside each of the tubular through holes of the vessel head there is fixed, in a coaxial position with respect to the tubular through component and with a certain radial clearance, a thermal sleeve which includes a diametrically widened part resting on a diametrically widened support zone situated at the top of the bore of the tubular through component; the thermal sleeve is mounted so as to rotate freely inside the through hole.

The extensions of the nuclear reactor reactivity control rods and the thermocouple columns pass through the vessel head inside the thermal sleeves which are themselves disposed coaxially inside the adaptors of the control rods or more generally inside the tubular through components of the head.

So as to increase the reliability and safety of operation of nuclear reactors and in order to extend the lifetime of these reactors, the operators are led to perform more and more numerous tests of the various elements constituting the nuclear reactor and, if necessary, repairs of defects which may have been detected.

In particular, it maybe necessary to monitor the state of the through components of the vessel head in order to make certain of the integrity of these components after a certain operating time of the reactor, in particular in the zone where these through components are welded to the vessel head.

Defects are detected on the internal surface of a through component, these defects must be repaired, for example by depositing a layer of a metal such as nickel on the internal surface of the through component, in the zone which has the defects, or alternatively by eroding the zone which has defects to a certain depth by machining with removal of material, and refilling this zone with a fault-free replacement metal.

The operations of testing and/or repairing the adaptors of the vessel head of a nuclear reactor must be performed inside the bore of the through component and consequently require demounting of the thermal sleeve, in order to access the internal surface of the bore of the through hole.

These tests and repairs must be carried out during a reactor shutdown, the vessel head being demounted.

The demounting of the thermal sleeve requires complex operations, as the widening of the thermal sleeve resting on a support zone disposed at the top of the adaptor prevents demounting of the sleeve by pulling downwards, on its lower part which is accessible beneath the head.

It is also not possible to demount the sleeve by pulling upwards, as the rod cluster control mechanisms which are fixed by screwing and welding to the tops of the adaptors prevent passage of the thermal sleeve.

It was therefore proposed in French Patent Application No. 9202405, filed in the names of Framatome and Electricite de France on Feb. 28 1992, to test the internal surface of the through component and possibly to repair this component when defects are detected, through a longitudinal slot machined in the thermal sleeve and passing through its wall.

When the repair is made by depositing a layer of nickel on the internal surface of the adaptor, in the zone which has defects, this repair necessarily requires demounting of the thermal sleeve. Furthermore, the electrolytic deposition of the nickel is in itself a long and therefore expensive operation. The length of work on the adaptors of a vessel head for performing the repairs or possibly a preventive treatment by deposition of nickel on the internal surface of the adaptor at the welding zone is of the order of ten days.

Furthermore, the repair or preventive treatment thus performed does not get rid of the cracked metal and the stresses which can lead to cracking underneath the nickel coating.

When the repair is made by eroding and refilling, it may be possible in certain cases to perform these operations through a slot which is machined in the thermal sleeve and used for testing the internal surface of the adaptor. However, no method and device are yet known which allow, simply, quickly, with perfect monitoring and with an excellent surface condition, the surface with defects to be eroded, i.e., the material of the component to be removed to a limited and perfectly monitored depth so as to generate a new fault-free surface.

Neither is a method known which allows simultaneous removal of the material which has defects and stress relief of the component to a certain depth.

More generally, no method is known for machining an internal cylindrical surface of a tubular component, in particular of a metallic component, which is both fast and efficient and which allows a new surface to be obtained which has perfectly defined geometrical and physical characteristics as well as stress relief of the component below the machined surface.

SUMMARY OF THE INVENTION

The object of the invention is therefore to provide a method for machining the cylindrical internal surface of a tubular component such as an adaptor fixed to the vessel head of a pressurized water nuclear reactor, with removal of material to a monitored depth, in order to generate a new surface having defined geometrical and physical characteristics, by erosion under the effect of a high-speed liquid jet containing a pulverulent abrasive material, which method is fast and efficient and results in an excellent surface condition and stress relief of the metal beneath the machined surface.

For this purpose, the liquid jet is directed at the surface of the component with an angle of incidence with the surface of the component between 30° and 90°, the jet is moved so as to sweep over the internal surface of the tubular component and at least two successive machining passes are made, the speed of sweeping over the surface of the component increasing from one pass to the next.

The method according to the invention maybe used in particular for making repairs or preventive treatment of the internal surface of an adaptor passing through the vessel head of a nuclear reactor.

BRIEF DESCRIPTION OF THE DRAWINGS

In order to facilitate understanding of the invention, several embodiments of the method according to the invention will now be described, by way of example, with reference to the attached drawings.

DETAILED DESCRIPTION

Figure 1:
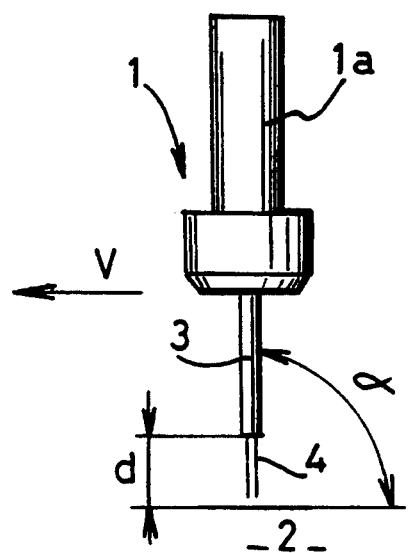
FIG. 1 is a schematic view of a machining tool using a waterjet with the surface being swept over.

FIG. 1 shows a tool is seen which consists of a nozzle 1 whose pressurized water jet ejection pipe 3 is directed at the surface of a metallic component 2 which is machined by removing a surface layer generally designated by those skilled in the art by the term "peeling".

The nozzle 1 includes a body 1a having a central cavity communicating with the bore of the pipe 3 constituting the output component of the nozzle 1 via a calibrated opening. Very high pressure water is introduced into the cavity of the body 1a of the nozzle, so that a very high speed jet 4 is formed at the output of the pipe 3 and strikes the surface of the component 2 opposite which the end of the pipe 3 is situated.

To regulate the operation of machining a surface layer of a component 2, or peeling, several parameters must be chosen as a function of the operation to be performed and of the nature of the component 2.

These parameters relate in particular to the liquid constituting the jet 4, generally water containing solid abrasive particles.

These parameters are the pressure of the liquid intended to constitute the jet 4, the speed of the liquid jet determining the impact energy on contact with the component 2, the mass flow rate of the particles conveyed by the liquid and the nature of these particles.

Other parameters for defining the method relate to the shape and position of the nozzle 1.

An important parameter is the angle $\alpha$ of inclination of the nozzle with respect to the surface of the component 2 at the point of impact; the angle $\alpha$ is always between 30° and 90° (normal incidence). A second parameter is the distance d from the end of the nozzle to the surface of the component 2.

Other parameters relate to the sweeping of the component. As will be explained later, it is possible to envisage various types of sweeping with any number of passes and generally with some overlap.

Among the parameters relating to the sweeping, account is taken in particular of the speed V of sweeping over the surface which is the speed of movement of the nozzle parallel to the surface of the component 2.

When the component is a nickel alloy such as an adaptor of the vessel head of a nuclear reactor, the speed of the water jet is set at a value close to 600 m/s, the water pressure is 3500 bar and the mass flow rate of the particles in the water jet is between 400 and 800 g/min.

The distance d is set at a value of a few millimeters and the speed V is greater than 0.1 m/min and preferably between 1 and 10 m/min.

According to the invention, the machining is performed in at least two successive passes, the speed of sweeping over the component being regulated so as to obtain desired machining conditions, in particular the desired machining depth. The speed of sweeping increases from one machining pass to the next.

The parameters are regulated so as to produce in at least two passes machining of the surface layer of the component 2, to a depth which can be of the order of 1 to 2 mm, with an excellent surface condition resulting from the machining.

It is necessary for the speed of the water jet to be set at a sufficient value, and in all cases this speed must be greater than 100 m/s.

The pressure of the liquid intended to constitute the jet may be regulated within a certain range, but this pressure should not be less than 2000 bar.

The mass flow rate, the nature and grain size of the solid particles conveyed by the liquid jet may be modified from one machining pass to the next; in all cases, the mass flow rate corresponds to a very low concentration of the particles in the liquid jet, as will be explained below.

The particles may consist of materials such as alumina, silicon carbide, zircon, olivine or garnet.

The size of the particles may be between 100 and 1000 $\mu$m.

The liquid jet may be flat or circular and its width or its diameter may be between 1 and 2 mm, as appropriate.

The speed of sweeping must be set at a value of several meters per minute in the case of machining a surface layer of an Inconel component. Because of the small dimensions of the surfaces of the components to be treated, periodic sweeping is necessary in order to obtain the desired speed of movement and to treat the whole of the required surface of the component.

Figure 2:
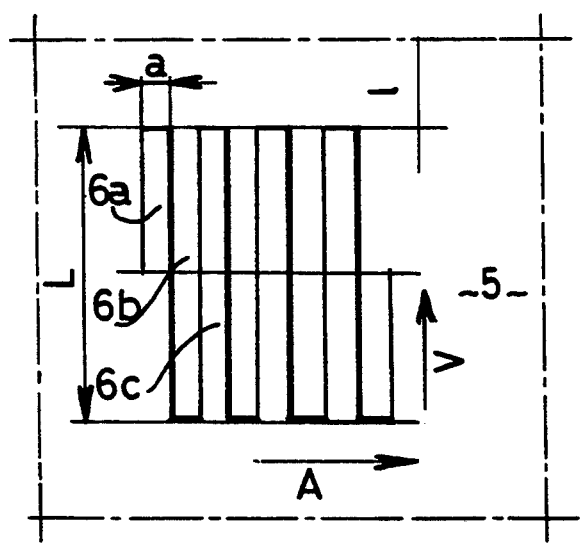
FIG. 2 is a plan view of the surface of the component showing the sweeping trajectory of a machining jet.

FIG. 2 represents the surface 5 of a component from which a surface layer is taken off by the method according to the invention.

The surface 5 is developed from the internal surface of an adaptor passing through the vessel head of a nuclear reactor.

The sweeping over the zone of the surface 5 in which the machining by water jet is carried out is performed in bands of length L and along the direction of advance A which corresponds to the circumferential direction of the internal wall of a tubular component such as an adaptor.

The nozzle and the water jet are moved at the cutting speed V in a direction perpendicular to the direction of advance A and successively in opposite directions, so as to cover the band of width L. Between two movements in opposite directions, the nozzle is advanced by one step of width a in the direction A.

Successive juxtaposed bands 6a, 6b, 6c are thus obtained with width a in which the surface layer of the component has been hollowed by the water jet loaded with abrasive particles.

The active width l of the water jet corresponds to the width of the impact zone of the water jet on the surface 5 of the component.

The sweeping at speed V is made along the axial direction of the adaptor, in a zone of width L, and the advance is made by circumferential movement of the nozzle by steps of width a.

The time interval necessary to perform the sweeping along the length L in both directions is called the sweeping frequency f.

The parameters relating to the liquid jet and to its eroding power as well as the parameters relating to the sweeping are interdependent and are set so as to obtain geometrical characteristics (shape and surface condition) and physical characteristics (hardness, stress condition) of the machined surface which are satisfactory.

It is to be noted that the sweeping speed or cutting speed may be set at a large value because of the alternate sweeping, which is favorable as regards the speed and quality of the machining.

The machining by removing material is carried out along successive hollow furrows which overlap laterally in order to constitute the bands 6a, 6b, 6c . . . visible in FIG. 2. The degree of overlap may be variable according to the machining characteristics sought, and the machining may be carried in one or more passes.

Further to these advantages, the method according to the invention compresses a surface layer (up to approximately 500 μm depth) of the machined metal, which relieves stress in the metal of the component, in the same way as during a peening operation by particles suspended in a gas.

Such a treatment allows reduction in the tendency of the metal to crack.

In the case of an adaptor passing through the vessel head of a nuclear reactor, it is thus possible simultaneously to remove a surface layer which includes cracks and preventively treat the zone of the adaptor situated in the vicinity of the weld fixing it to the head in order to relieve stress and improve its resistance to cracking.

The sweeping over the surface of the component may be carried out not only in the manner which has been described, with movement by successive steps of the nozzle with respect to the surface of the component in the direction A in order to obtain juxtaposed machined zones of rectangular shape, but alternatively with continuous movement in the direction A, so as to obtain a machined zone of sinusoidal or pseudo-sinusoidal shape.

In machining of the internal surface of an adaptor through a slot made in the thermal sleeve of the adaptor, complete machining of the zone to be treated may be achieved either by helicoid movement generated by rectilinear movement of the nozzle along the direction of the slot combined with rotation of the thermal sleeve around its axis, or by successive vertical movements of the nozzle through the slot of the thermal sleeve combined with a slow rotational movement of the sleeve.

The surface condition of the wall of the adaptor and the stress condition of the metal under the machine surface may be adjusted by setting the conditions relating to the sweeping.

It is to be noted that the abrasive particle mass flow rates entrained by the pressurized liquid jet correspond to a very low density of the solid particles inside the liquid jet, because of the very high speed and the large flow rate of this liquid jet.

On average, the density is one particle per few millimeters of linear length of the liquid jet. Because the distance between the end of the nozzle and the surface of the component to be treated is of the order of a few millimeters, the abrasive particles are not capable of disrupting ultrasonic measurements which may be performed by using the pressurized water jet itself as the coupling liquid. It is therefore possible to connect an ultrasonic transducer to the liquid jet ejection nozzle, so as to perform measurements such as very precise machining depth measurements by using the liquid of the abrasive jet as the coupling liquid.

It is also possible to provide for a second jet parallel to the machining jet in order to perform the coupling of an ultrasonic transducer with the surface being machined.

In all cases, it is possible to obtain very precise measurements relating to the depth and evenness of machining.

It is therefore possible either to preregulate the parameters of the jet and the parameters of the sweeping in order to obtain the desired machining, or to regulate some of these parameters during machining, for example as a function of a measurement of machined depth.

It is to be noted that it is possible to machine to a variable depth, with a perfectly determined profile, by modulating some of the machining parameters, such as parameters of the jet or parameters of the sweeping.

An adaptor passing through the vessel head of a nuclear reactor and the application of the method according to the invention to taking off an internal surface layer of this adaptor, in particular in its zone of welding to the head will now be described with reference to FIG. 3.

Figure 3:
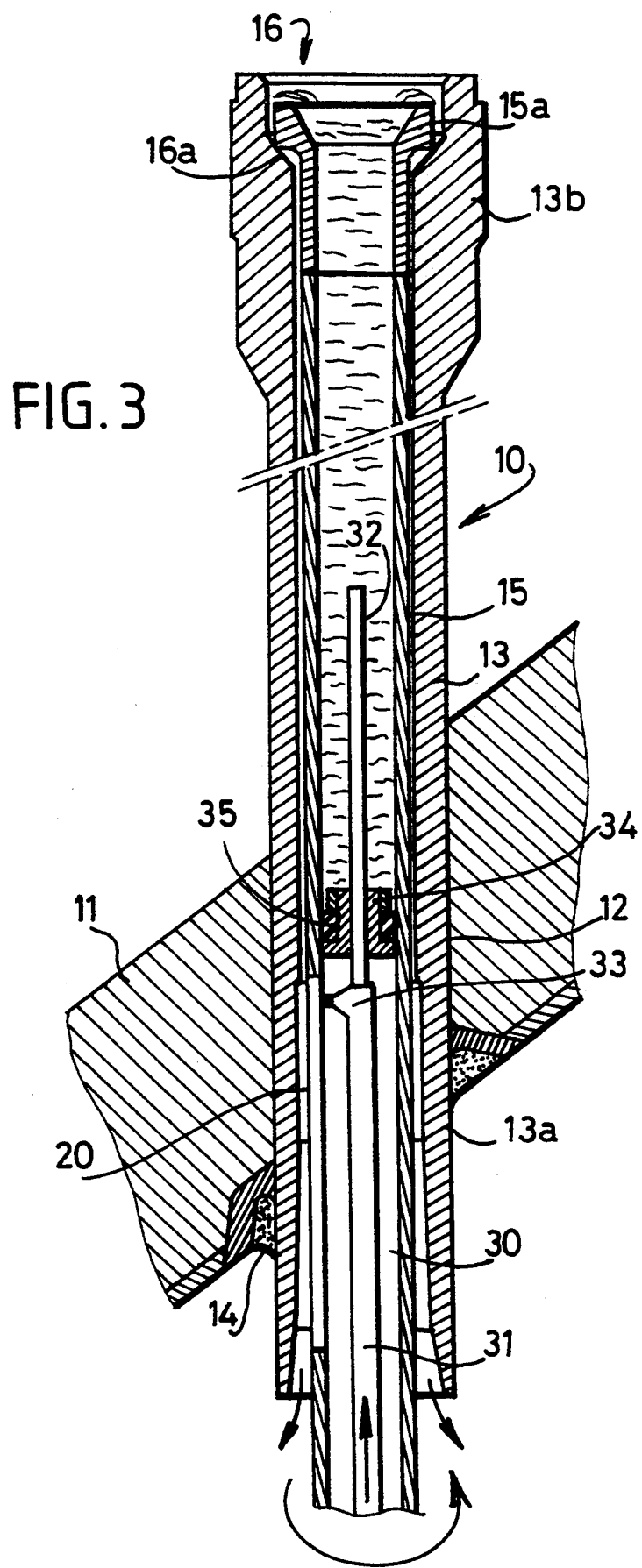
FIG. 3 is an axial section of an adaptor and a device for jet-machining the internal surface of the adaptor, according to a first embodiment.

FIG. 3 represents an adaptor 10 passing through the nuclear reactor vessel head 11. Passing through the head 11 is an opening 12, inside which is fixed a tubular component 13 constituting an adaptor allowing passage of an extension allowing movement of a control rod cluster inside the vessel of the nuclear reactor.

The adaptor 13 which has a tubular shape, includes a span 13a whose diameter corresponds to the diameter of the opening 12 and which is fixed by an annular weld bead 14 to the internal lower surface of the head 11, and a diametrically widened upper part 13b situated outside and above the vessel head 11.

A thermal sleeve 15 which has a tubular shape is disposed coaxially inside the internal bore of the adaptor 13.

The thermal sleeve 15 comprises a diametrically widened upper part 15a resting on a bearing surface 16a which has a frustoconical shape constituting the upper part of the internal bore 16 of the tubular adaptor 13.

The sleeve 15 is mounted with some radial clearance and remains free to rotate inside the adaptor 13.

The control mechanism of the adaptor 13 (not shown) allowing movement of the extension and of the control rod cluster passing through the head inside the adaptor is fixed to the widened upper part 13b of the adaptor 13.

The thermal sleeve 15 is integral, at its bottom, under the vessel head and the bottom of the adaptor 13, with a centering cone which, when the head 11 is positioned on the reactor vessel, centers the ends of the rod cluster control rods constituting extensions of these rodclusters engaged in the vertical direction inside the core of the reactor disposed in the vessel.

After a certain time of operation of the reactor, it is desirable to check the state of the adaptors 13 passing through the vessel head, and in particular that part of the adaptors fixed to the vessel head by an annular weld such as 14.

This monitoring, essentially of the internal surface of the bore 16 of the adaptor in the weld zone 14, may be carried out ultrasonically by using an ultrasound beam emitted by a probe brought up against the internal surface of the bore of the adaptor.

It has been proposed, in the above-identified French patent application to monitor the weld zone 14 of the adaptor 13 by making a slot such as 20 through the wall of the thermal sleeve 15 and over a certain axial length.

The machining of the slot may be performed by using an abrasive jet, in several successive passes, and by setting the machining power of the jet at a low value during the last pass, during which the jet breaks through to the adaptor.

The monitoring may be performed by using an ultrasound probe whose beams pass through the slot in order to reach the internal surface of the adaptor. The internal surface of the adaptor is swept by moving the probe in the longitudinal direction of the slot and by moving the thermal liner in rotation about its axis inside the adaptor.

When these defects are detected by the ultrasonic monitoring, a repair must be made.

As indicated hereinabove, this repair may be made by machining the surface layer of the adaptor in the defective zone, by the method according to the invention, using a very high speed abrasive jet.

FIG. 3 shows a machining device 30, for machining with the jet a part of the internal surface of the adaptor 13, through the slot 20.

The device 30 includes an external tube 31 and an internal tube 32 mounted coaxially inside the external tube 31. The internal tube 32 includes an upper part outside the external tube 31, whose upper end is fixed in a leaktight manner to the internal tube 32.

A nozzle 33 of the type represented in FIG. 1 is fixed to the upper end of the tube 31 so as to be able to be supplied with very high pressure liquid via the annular space contained between the tubes 31 and 32.

A leaktight plug 34 including a seal 35 is engaged and fixed to the inside of the thermal sleeve 15, above the slot 20.

The internal tube 32 is engaged in a leaktight manner in the body of the plug 34, by its part situated outside the tube 31, so that the unit consisting of tubes 31 and 32 is mounted so as to slide inside the thermal sleeve 15 along the direction of the axis of the sleeve and integral with the sleeve driven in rotation inside the adaptor 13.

The end of the nozzle 33 is directed at the slot 20.

The alternate sweeping over the internal surface of the adaptor 13 by the pressurized abrasive liquid jet is made by moving the nozzle 33 along the slot 20 and by moving the sleeve 15 around its axis inside the adaptor.

Both movements are regulated so as to obtain sweeping conditions as described hereinabove with reference to FIG. 2 or as indicated in the example which will be described hereinbelow.

The water travelling through the internal tube 32 flows into the upper part of the sleeve above the leaktight plug 34 and fills the sleeve up to its upper end 15a before flowing into the annular space between the sleeve 15 and the adaptor 13.

Climbing of the abrasive particles of the machining liquid into the upper part of the adaptor, above the zone being machined, is thus avoided. On the contrary, the abrasive particles are entrained downwards and collected at the lower part of the adaptor.

The machining of the internal surface of the adaptor 13 in the weld zone 14, in order to remove cracks that may have been detected and to generate a defect-free surface, must be carried out in several successive passes, as will be indicated in the example described below.

EXAMPLE

The internal surface of a through adaptor of a vessel head of a pressurized water nuclear reactor made of nickel alloy having cracks in the area of the welded join was machined with a jet in three successive passes with alternate sweeping over the component as described in a general manner with reference to FIG. 2.

The first and second passes were machining passes with a jet with abrasive and the third pass was a cleaning pass with a high pressure pure water jet.

The first machining pass or rough pass was carried out under the following conditions:

Alternate sweeping over a length L=100 mm
Sweeping speed: 2.5 m/min
Advance step: 0.5 mm
Abrasive flow rate: 750 g/min
Type of abrasive: olivine of particle size 20
Average machining depth: 0.824 mm
Material removal rate: 0.97 cm$^3$/min
Waste liquid volume: 3.5 dm$^3$/cm$^3$ machined
Waste solid volume: 0.42 dm$^3$/cm$^3$ machined
Machining time: 2 min 32 s
Area covered: 11.84 cm$^2$/min.

The second machining pass or finishing pass was carried out under the following conditions:

Alternate sweeping over a length L=100 mm
Sweeping speed: 10 m/min
Advance step: 0.5 mm
Abrasive flow rate: 750 g/min
Type of abrasive: olivine of particle size 20
Average machining depth: 0.242 mm
Material removal rate: 1.14 cm$^3$/min
Waste liquid volume: 2.98 dm$^3$/cm$^3$ machined
Waste solid volume: 0.36 dm$^3$/cm$^3$ machined
Machining time: 38 s
Area covered: 47.36 cm$^2$/min.

The third pass was a cleaning pass with a water jet, allowing removal of abrasive particles embedded in the machined surface.

The essential parameter is the sweeping speed which is set at a value four times greater during the finishing pass than during the rough pass.

The machining in several passes which allows the machining conditions to be optimized and a high quality machined surface to be obtained is thus made in such a manner that the sweeping speed increases from one machining pass to the next.

In order to avoid abrasive particles being embedded in the surface of the machined component, it is preferable, at least during the finishing passes, to use an abrasive not containing silica.

The slit 20 through the sleeve may itself be made by machining with a water jet loaded with abrasive. It may be advantageous to protect the internal surface of the adaptor during machining, by using a tungsten sheet placed between the sleeve and the adaptor, although machining marks on the surface of the adaptor are not actually a problem, as the surface of the adaptor must be remachined.

Furthermore, the slot will preferably be machined in several passes. During the last pass, the jet passes through the sleeve and emerges opposite the surface of the adaptor. The machining is performed in such a way that the remaining thickness of the Wall of the sleeve after the penultimate pass is as small as possible.

The machining power of the jet defined by the parameters, such as the speed of the jet, abrasive mass flow rate and sweeping speed, is set at a low value during the last machining pass.

Figure 4:
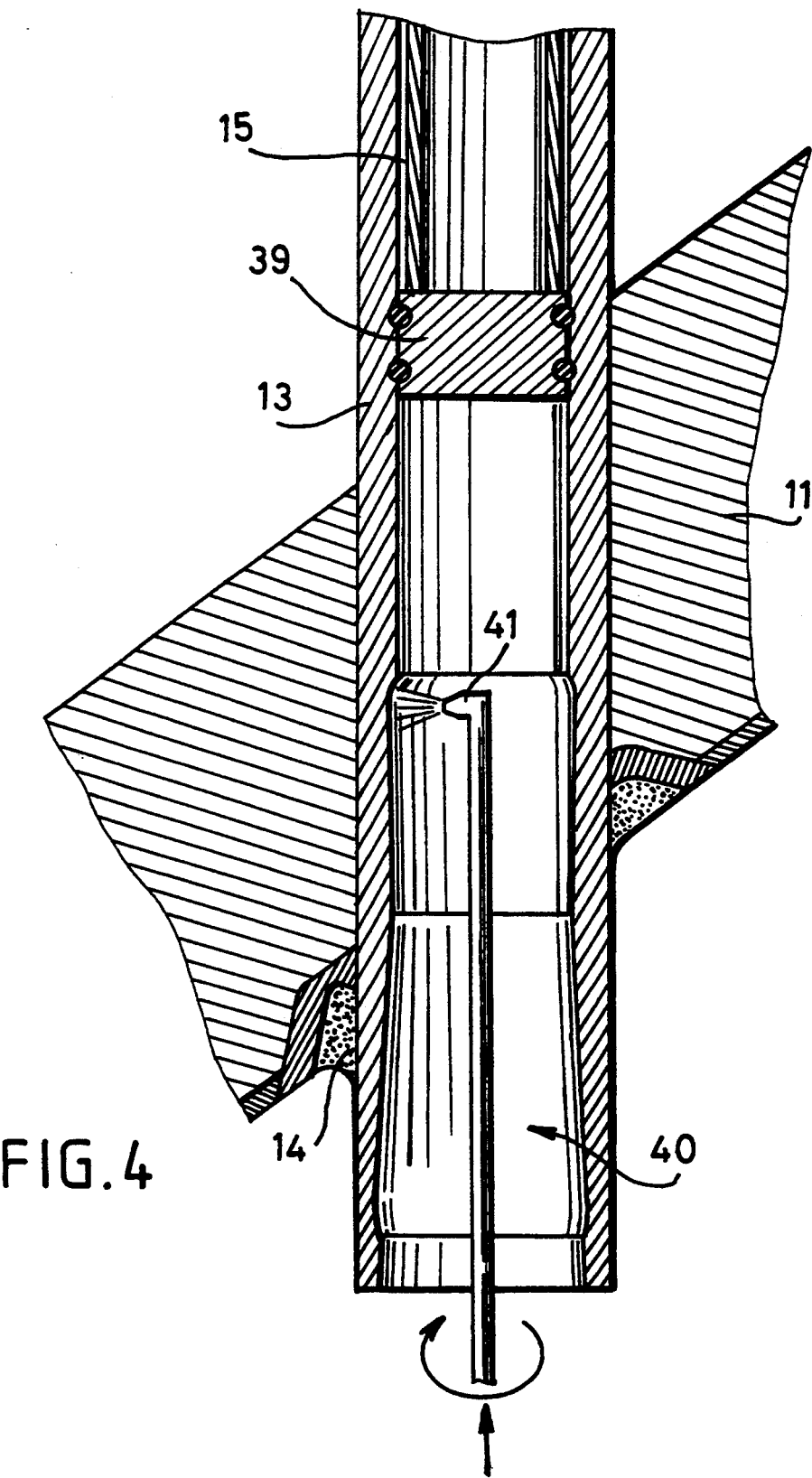
FIG. 4 is an axial section of an adaptor and a device for jet-machining the internal surface of the adaptor, according to a second embodiment.

FIG. 4 represents a through adaptor of a vessel head in which machining is carried out by the method of the invention by using a device according to one embodiment.

The corresponding elements in FIGS. 3 and 4 are designated with the same numbers.

The lower part of the thermal sleeve 15 has been cut off and extracted from the adaptor 13. Beneath the remaining part of the sleeve 15, a leaktight plug 39 has been placed.

The machining device 40, which is moved in rotation around the axis of the adaptor and in translation along this axis in the zone of the weld 14, includes a tube supplied with machining fluid at the end of which a nozzle 41 is fixed.

The conditions of machining and sweeping by the abrasive jet are set as before; in particular, the machining is carried in at least two successive passes. The sweeping speed increases from one machining pass to the next.

The method according to the invention allows machining to a monitored depth beneath the surface of a tubular component to be performed with a very high degree of evenness and a very high speed of execution, in order to obtain a new surface with high precision and a very good metallurgical quality.

In certain cases, the stress relief of the component obviates the necessity of depositing a refilling layer on the component after surface machining.

Varied machining profiles may be obtained by modulating the parameters of the machining which relate to the jet itself or to its movement with respect to the surface of the component.

In application of the method according to the invention to eroding and repairing the internal surface of an adaptor passing through the vessel head of a nuclear reactor, the method may be implemented through a slot in the wall of the thermal sleeve of the adaptor, which avoids long and expensive demounting or cutting up of this sleeve.

Furthermore, the conditions of machining with the jet may be perfectly monitored, for example by using an ultrasonic transducer which is coupled to the surface of the component via the pressurized liquid jet.

The method according to the invention also has the advantage of producing a relaxation of the stresses inside the component, by compressing this component by an operation similar to peening.

The mode of sweeping of the surface to be machined and the various parameters relating to the jet and to its movements with respect to the surface of the component may be different from those which have been indicated. The number of machining passes may be greater than two.

It is also possible to use solid particles in proportions which are different from those which have been given, it being possible for these solid particles to be of a chemical nature and particle size different from those which have been indicated hereinabove.

Finally, the method according to the invention applies not only to machining a defective surface layer inside an adaptor passing through the vessel head of a nuclear reactor, but also to the machining of the internal surface of tubular metallic components of any type in order to generate a new surface having defined geometrical and physical characteristics. This machining may be performed solely at isolated defects, such as cracks, before refilling the cracked metal with undamaged metal, or over the whole area of a component.

It is possible to perform machining according to the method of the invention over a surface of a component before subjecting it to compression with stress relief by peening.

It is possible to strip and prepare any metallic surface inside a tube before a treatment, or alternatively to condition a surface without subsequent treatment in order to make it resistant to wear or corrosion.

The method according to the invention may also be adapted to the surface machining of tubular non-metallic components.

The machining device used may be different from the devices described hereinabove. In particular, it is possible to use devices including several abrasive liquid ejection nozzles having different directions, so as to direct several jets simultaneously onto the surface to be machined.

We claim:

1. Method for machining the cylindrical internal surface of a tubular component such as an adaptor fixed to the vessel head of a pressurized water nuclear reactor, with removal of material to a monitored depth, in order to generate a new surface having defined geometrical and physical characteristics, by erosion under the effect of a high-speed liquid jet containing a pulverulent abrasive material, said method comprising the steps of directing said liquid jet at the surface of said component with an angle of incidence with a surface of said component between 30° and 90°, moving said jet so as to sweep over said internal surface of said tubular component, and carrying out at least two successive machining passes, the speed of sweeping over said surface of said component increasing from one pass to the next.

2. Method according to claim 1, including the steps, of carrying out, in succession, a first machining pass with a liquid jet containing an abrasive pulverulent material at a first sweeping speed, a second machining pass with a liquid jet containing a pulverulent material at a second sweeping speed greater than said first sweeping speed, and a third cleaning pass with a high-pressure liquid jet free of abrasive material.

3. Method according to claim 1 or 2, including moving said liquid jet over said surface of said component at a speed between 1 m/min and 10 m/min.

4. Method according to claim 2, wherein, during said first machining pass, said jet is moved at a speed close to 2.5 m/min, and during said second machining pass, said jet is moved at a speed close to 10 m/min.

5. Method according to claim 1, wherein the speed of liquid in said jet is close to 600 m/s.

6. Method according to claim 1, wherein the pressure of the liquid of the jet is close to 3500 bar.

7. Method according to claim 1, wherein the mass flow rate of the abrasive pulverulent material in the jet is between 400 and 800 g/min.

8. Method according to claim 1, wherein the movement of the jet in contact with the surface of the component is an alternate sweep along juxtaposed rectilinear bands.

9. Method according to claim 1, for machining the cylindrical internal surface of an adaptor passing through the vessel head of a nuclear reactor and comprising a thermal sleeve disposed coaxially inside the adaptor, wherein the jet is directed onto the internal surface of the adaptor from inside the sleeve through a slot passing through the wall of the thermal sleeve.

10. Method according to claim 9, wherein said jet is moved inside said slot and said sleeve is moved in rotation around its axis inside said adaptor so as to sweep said internal surface of said adaptor in a defective zone.

11. Method according to claim 9, including cutting out a part of said sleeve so as to provide access to the internal surface of said adaptor and moving said jet in rotation and in translation inside said adaptor.

12. Method according to claim 10 or 11, including forming said slot by machining the wall of said thermal sleeve with a pressurized jet.

13. Method according to claim 1, including the step of monitoring the thickness of the surface layer taken off by said jet by ultrasonic measurement using said jet as a coupling liquid between an ultrasonic transducer and the surface of the metallic component.

14. Method according to claim 1, wherein said abrasive pulverulent material is constituted by solid particles of a material selected from the group consisting of garnet and olivine and has a particle size of between 100 and 1000 $\mu$m.

* * * * *